358-69. XR 2,744,952 SR

SEARCHROOM
T6510
X6532

May 8, 1956 E. O. LAWRENCE 2,744,952

COLOR TELEVISION APPARATUS

Filed June 29, 1951 5 Sheets-Sheet 1

INVENTOR.
ERNEST O. LAWRENCE
BY
Lippincott & Smith
ATTORNEYS.

O GREEN PHOSPHOR
Δ RED PHOSPHOR
□ BLUE PHOSPHOR

INVENTOR.
ERNEST O. LAWRENCE
BY
Lippincott & Smith.
ATTORNEYS.

INVENTOR.
ERNEST O. LAWRENCE
BY
Lippincott & Smith.
ATTORNEYS.

INVENTOR.
ERNEST O. LAWRENCE
BY
Lippincott & Smith
ATTORNEYS.

INVENTOR.
ERNEST O. LAWRENCE
BY
Lippincott & Smith
ATTORNEYS.

United States Patent Office
2,744,952
Patented May 8, 1956

2,744,952

COLOR TELEVISION APPARATUS

Ernest O. Lawrence, Berkeley, Calif., assignor to Chromatic Television Laboratories, Inc., New York, N. Y., a corporation of California Application June 29, 1951, Serial No. 234,189
19 Claims. (Cl. 178—5.4)

This invention relates to polychrome television image producing apparatus. It is particularly directed to tube apparatus wherein a suitably modulated and positionally controlled scanning cathode-ray beam is caused to impact the tube image producing target there to form an image in color of a scene, object or representation of any other sort. Such an image will substantially duplicate both in color fidelity and in light and shadow intensity that image which is analyzed by suitable camera tube circuit arrangements at points of image pickup. The invention in one broad sense is directed to circuits operating in conjunction with such tube apparatus for linearizing scanning operations at receiver or monitorizing points so that a scanning cathode ray beam in its traversal of the target area may be accelerated or decelerated in accordance with departures in the rate of scanning from some suitable optimum rate determined and selected prior to the time of image analysis in color and preferably established by operational standards of the system.

For convenience of reference, the apparatus and system will be described in connection with a tricolor operation of the additive type, but it is to be understood that the principles disclosed are equally applicable to bicolor, quadricolor or other multicolor forms of image recreation.

In color television apparatus it has already been proposed to recreate the image directly upon the target end of a cathode-ray tube. One or more scanning cathode-ray beams are caused to be suitably deflected and then to impinge upon a phosphor-coated target to create the luminous effects. One form of target surface used for this purpose has comprised a series of strips each of sub-elemental width and of a length substantially corresponding to one dimension of a traced raster. The phosphor-coated strips of sub-elemental width, illustratively, may be positioned adjacent one another. Suitable means are provided whereby the scanning cathode-ray beam impinging upon the target from a point of beam origin may be accelerated to a relatively high velocity during the time the beam impacts the target area, and also focused sharply to the target at the point of impact. Then, as the scanning cathode ray beam traverses the target area, preferably in a path which is transverse to the target strips, a raster will be scanned. An image will be caused to appear in different colors as the target strips are electronically excited to a luminescent state by an impinging signal modulated scanning cathode ray beam. The scanning beam modulation is usually under the control of signal pulses received from suitable transmitting or pickup points.

To trace the raster, the scanning beam is bidirectionally deflected by electromagnetic or electrostatic means (or a combination of both) so that the pattern traced is generally rectangular with the individual lines extending transversely to the strips of the target area. The suggested form of target area embodies strips of sub-elemental width repeating in a color cycle of, say, red, blue, green, red, and so on. This is illustrated, since the color cycle may be such that one color predominates over the others. An example of this latter type of target area is, for instance, one formed of subelemental width strips of phosphors producing light under electronic beam impact in the colors red, green, blue, green, red, green, and so one, as the scanning operation takes place. The term "phosphor" thus can be considered to mean any substance or solid which produces light upon absorbing primary energy, such as the electrons of a cathode-ray scanning beam. The light radiation thus can be considered as luminescence within the spectral range of the excited material. For ease of reference, for instance, the phosphor which reacts to the impacting electron beam to produce light in green may often be termed the "green phosphor," despite the fact that its actual color, as viewed, may have no relationship to the color of light developed by excitation thereof.

Due to the fact that the scanning beam is deflected relative to the target so as to move transversely to the strips thereof as scanning of each raster occurs, and because of the fact that the deflection or traversal in these directions is controlled by the incoming synchronizing pulses accompanying the modulating video signals, it often happens that the rate of deflection in each linear path may vary from instant to instant due to many and varied causes. One such cause is in the nonlinearity of the scanning deflection wave as the scanning beam traces the target. The departures from linearity in the receiving or monitoring apparatus may not necessarily correspond precisely to that degree of precision obtainable in an accurately alined transmitter.

The transmitter is usually an expensive installation and, as such, precision-type operations are contemplated. For relatively inexpensive receiver types of apparatus, the deflection control unit (circuits and coils for instance) is usually of the type which is designed to sell in quantity production at modest prices. The result is that the degree of precision to be expected of the transmitter is not necessarily always obtainable in receivers at reasonable cost. Under these circumstances, and in the absence of a supplemental control, as will herein be described, where there is a variance in the scanning deflection rate at the receiver with respect to the transmitter, it conceivably could happen that the instantaneous color in which the picture image is created would be at variance with the actual incoming signal modulation. This would result in a loss of color fidelity.

Consequently, the present invention attempts to overcome these defects of the prior art through the inclusion in receiver apparatus of scanning beam linearizing circuits of relatively simple character which serve to establish substantially a constant rate of scanning beam motion with respect to the image-producing target of the tube. In this way, with proper initial color phasing, it is possible to insure a higher degree of color fidelity than heretofore obtainable.

Proposals have already been made in the prior art whereby a scanning beam was caused to trace a tube target consisting of a plurality of adjacently-positioned strips, layers or sheets coated with suitable luminescent material or phosphors to produce light in different colors. These systems of the prior art, however, have generally suggested that the scanning of the strips of the target take place in paths coinciding with the longitudinal dimension of the target strip. In order to maintain the desired color of scanning along the selected line, various proposals tending to control and linearize the scanning operation in the event of departure from a single color have been known. These provided, essentially, for the establishment of a color control signal which compensated for a scanning operation in which the scanning beam more or less tended to hunt between adjacent color strips rather than to trace a path precisely representing the desired color.

The present invention departs from arrangements of the prior art through its provision of suitable control means for establishing and maintaining linearity of a scanning operation which occurs in paths transverse to the long dimensional strip. To this end, auxiliary electrode elements are included in the image-producing tube on the scanning beam side of the target area. These electrodes are conducting wires or strands which are of small diameter relative to the strip width. The conducting strands are supported adjacent strip areas which respond to the impacting cathode-ray scanning beam to develop light in one primary or component color only of the polychrome. That signal energy which is developed under such circumstances is then used as a representation of the rate or phase of the color scanning. It is compared with a constant frequency locally developed to represent the desired instantaneous scanning rate.

Each time the impacting scanning cathode-ray beam impinges upon a target strip adjacent which a conducting element is positioned a minute portion of the scanning cathode-ray beam is intercepted and a signal which is characteristic of the rate of occurrence of the selected light color in the scanning of the target is developed. This electrode element may generally be regarded as being a strand of a conductor of such minute dimension transverse to the direction of rapid beam motion relative thereto that a negligible portion only of the impinging cathode ray beam is intercepted. Where a tricolor system is utilized and the three phosphors are arranged to produce light in the additive component colors of red, blue and green, it will be appreciated that by positioning the wire strands serving as the conductors and indicators of the time of the beam traversal adjacent to the blue target strip, the amount of beam current intercepted in this blue area will be but a small percentage of the beam current available. The eye of the observer, being far less sensitive in the blue, will generally not be able to notice a reduction in brilliance of high lights in this color running as high as the order of 10%. Therefore, as a general rule, compensation for light reduction is not required. Where, however, compensation is required, it is apparent that suitable switching and commutating means of the purely electronic type may be used to apply appropriate biasing of the scanning beam as it scans one color with respect to its scanning of the other colors to restore the equality.

Illustratively, if the tube is considered as applicable to recreating color images on a cathode ray tube having a diameter of 16" and operating upon standards corresponding to present black-and-white, except for the color indicia, the individual color strips may each be of a width of the order of 1/100". By providing the tracking wire strands as wires of a diameter of the order of 1 mil, a 10% interception only of the beam will be realized. A reduction of this nature is so slight as generally to be imperceptible in the created image.

In alternative forms, through the use of suitable filters and light-responsive photo-tubes, signal indications indicative of the time of excitation of each separate color strip may readily be obtained and the effect of the tracking control at once realized. Under these conditions of operation, it is unnecessary to provide the tracking wire strands, and thus any reduction in beam current occasioned by such wires is immediately eliminated, at the expense of apparatus components generally arranged externally of the tube.

In a preferred form of the invention, provisions are made for locally generating generally accurately timed signals representative of the optimum rate of scanning. These signals are compared with those developed by the motion of the scanning beam relative to the target and its impact upon the target strips to develop one particular and selected color of light. The resulting signal is then used to control the scanning beam motion so that it is caused to track with what can be considered to constitute a linear operation at the transmitter, as simulated, by the stabilized local control at the receiver.

The receiver makes provision for allocating the incoming signal pulses representative in sequence of one or the other colors of the multicolor to particular impact areas so that the incoming signal modulation representative of red, for instance, shall not become effective to modulate the scanning cathode ray beam when it is actually scanning a green light-producing section of the target. To this end, the local oscillator as actually used for controlling the scanning beam motion serves as the controlling medium to key the various color signals to modulate the image reproducer tube. This keying provides for allocating the incoming signals to the particular color of the target being scanned, but the initial color phasing must be established through the control of the incoming signal, and a first designation accompanying the effect at the transmitter, or it may be effected directly in the receiver itself, as will be explained.

With these thoughts in mind, one of the main objects of the invention is that of providing cathode ray tube apparatus wherein the color displayed upon the target area of the tube is controllable and matched to that of the color being received by purely electrical means.

A further object of the invention is that of providing purely electrical means for linearizing the image reproduction of a polychrome television image determined in accordance with the departures from linearity as actually resulting in comparison to a synthetically obtainable indication of a condition obtained at a remote point.

Other and further objects and advantages will become apparent upon reading the following specification and claims in connection with the drawings wherein the invention has been illustrated in certain of its preferred forms, and where Fig. 1 schematically represents one form of the invention in block diagram arrangement;

Figure 1:
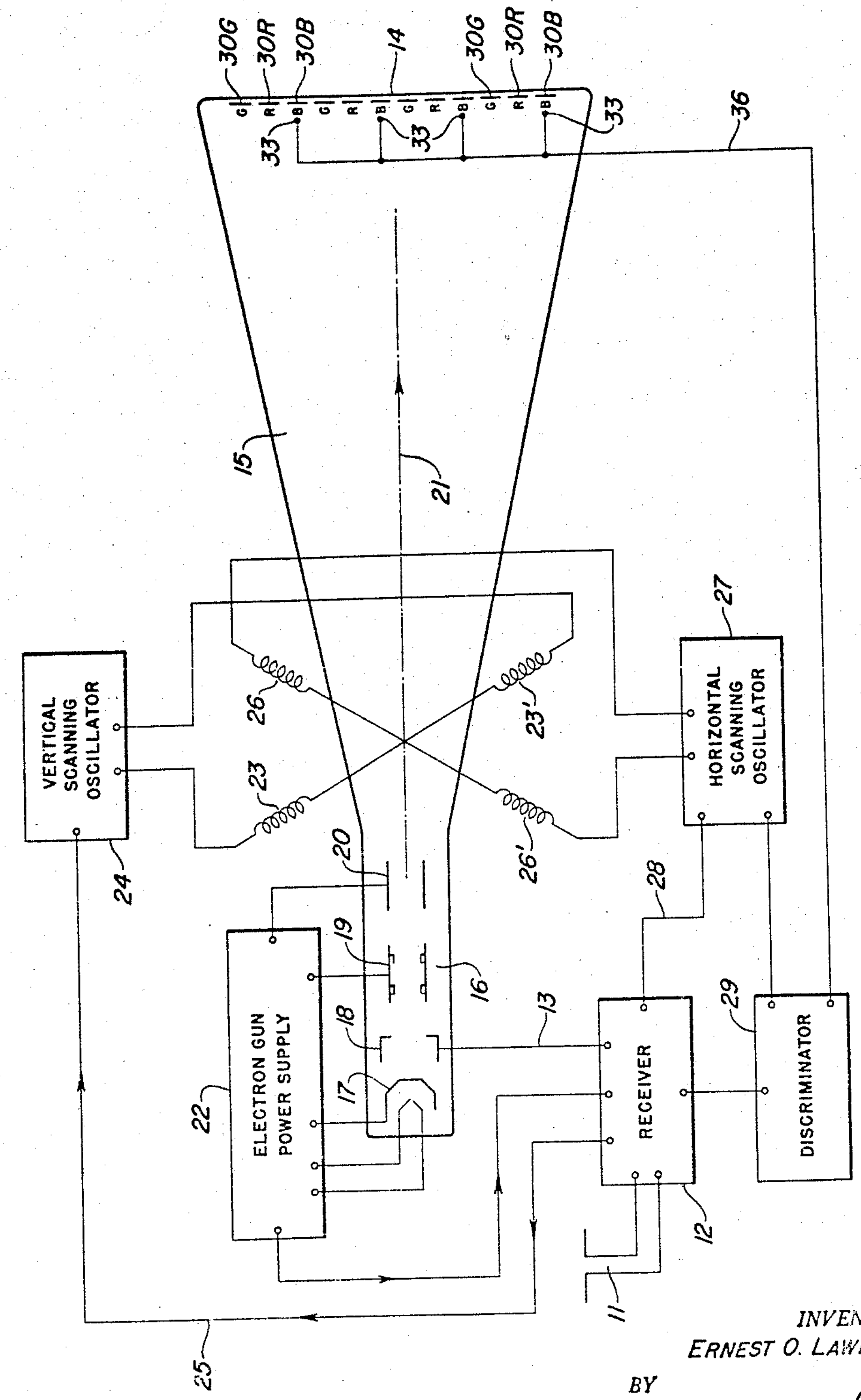

Referring now to Fig. 1 of the drawings for a further understanding of the invention, incoming television signals (together with the concomitantly transmitted sound signals which will not be specifically considered herein) are adapted to be received over any suitable communication channel by way of the schematically represented dipole 11 or connections to any source of signals, such as a coaxial cable, so that the incoming signals are supplied to the conventionally represented receiver 12. The receiver 12 is of generally normal form. As such, and for the purposes of this description, ignoring sound signal reception, it comprises suitable circuitry for selecting television signals and distinguishing such signals from the image synthesizing signal information accompanying the same as a part of the composite video signal. Accordingly, the receiver instrumentality 12 will be understood to comprise a suitable tuner for selecting incoming signals, R.-F. amplifiers (if desired) for amplifying the selected signals, suitable local oscillators and converters for transforming the selected signals to intermediate frequencies, suitable intermediate frequency amplifiers for the video signals, the accompanying synchronizing signals, demodulators and video-audio and sync signal amplifiers, none of which is shown for reasons of simplification, and because the disclosed apparatus is of generally conventional and commercially used character, that is to say, for instance, such components as the head end, the demodulator, sync signal separator and the video amplifiers, any or all of which may be modified for use with this invention in the manner herein to be described.

Outputs from the receiver instrumentality 12 are shown by single wire connection only, for reasons of simplification, although it will be appreciated that the necessary return paths may be furnished by separate conductors or by ground connections of the illustrated components, or by various other known methods of closing and completing the circuits. The suitably selected and amplified video signal information is then obtainable upon a conductor 13 connected to an appropriate output terminal of the receiver 12 and made available to signal modulate or otherwise control the intensity of the resultant image produced for observation on the target area 14 of a suitable cathode ray image-producing tube 15.

Within the cathode ray-tube 15 there is an electron gun, conventionally represented at 16, which comprises, illustratively, the electron emitting cathode 17 (together with its heater), the control electrode 18, and suitable anodes 19 and 20. The cathode ray beam, designated by the dot-dash line 21, is accelerated in the direction shown by the arrow from the electron gun 16 to the target 14. It is suitably signal controlled or modulated by the receiver signal output, as available on the conductor 13 (as a result of keying the signals through suitable gates, as will later be described in detail) connected to the modulating or control electrode 18, so that the scanning cathode-ray beam, instantaneously reaching the target area 14, shall be controlled in its intensity in accordance with received signal energy.

Suitable operating voltages for the receiver 12 and the various electrode components of the cathode-ray image-producing tube 15 are obtained from the conventionally designated electron gun power supply 22, which also supplies the necessary operating voltages to the receiver.

The scanning cathode-ray beam 21, as directed to the tube target 14, is caused to trace a raster of appropriate form under the influence of electromagnetic fields derived from vertical or field deflection coils 23 and 23', to which control energy is supplied from the conventionally designated vertical scanning oscillator 24, supplied with triggering and control signals via the conductor 25 from the receiver 12. The cathode-ray beam is also deflected under the influence of a second deflecting field, commonly called the horizontal deflection, by horizontal deflecting coils 26 and 26' which are energized from the output signals derived from a conventionally represented horizontal scanning oscillator 27, which is, in turn, controlled by signals supplied to it through the conductors 28 from the receiver 12.

The horizontal scanning oscillator also has its control upon the scanning beam modified under the control of the output from a discriminator unit 29, as will presently be explained.

Reverting now for the moment to the cathode ray image-producing tube 15, the target area thereof is formed from a series of strips of phosphors or other suitable luminescent compounds designated 30G, 30R and 30B, for instance, to represent phosphor strips intended to produce light in green, red and blue colors. These phosphor strips are preferably coated upon the end wall of the tube target area. Accordingly, there is on the inner surface of the tube a plurality of adjacently-positioned bands of phosphor material. Excitation of these phosphors by an impacting or impinging cathode-ray beam 21 will cause light to be developed thereat and to become visible to lookers.

Various forms of tube targets of this nature are known in the art. Accordingly, suffice it to say that the strips 30 are each of a sub-elemental width and of a length corresponding, for instance, to the height of the raster to be traced, or slightly greater than such dimension. Translating the size of these components to a television tube of the so-called 16" variety, as an illustration, it will be appreciated that each phosphor strip is of a width of approximately $\frac{1}{100}$" (just slightly less) assuming (1) that the receiver amplifier has a pass band of approximately 4 megacycles, (2) that horizontal or line blanking persists for approximately a 14% time period, and (3) that the images are being reproduced in tricolor repetition at rates corresponding to now presently accepted standards. Where the length or height of such strips is made equal to the raster height, or slightly longer, it will be seen that for the assumed tube size, each strip will be in the general neighborhood of 10" in length. The complete series of phosphor strips of suitable chemical composition to produce light under electron beam impact in the additive primary or component colors of green, red, and blue is then preferably coated with an aluminizing coating on the side toward the scanning beam origin. This provides the well known form of aluminum backing for the tube and, as is well known in the art, serves to avoid an objectionable spot. At the same time, the coating increases the usable amount of light developed due to the beam impacting the phosphor coated target area. Beam tracking or probe electrodes 33, which are electrically interconnected, are positioned adjacent the screen strips in such a manner that probes are uniformly spaced from one another, and also so located that probes are intermediate the electron gun and phosphor strips which produce one color of light only.

The probes 33 preferably consist of wires or conductors extending longitudinally of the phosphor strips, and extending parallel to one edge of the strips. The wires are of such size relative to the phosphor strip width as to intercept only an extremely small percentage of the total electrons forming the cathode-ray target-scanning beam. With these probes, located in the path of the cathode-ray scanning beam 21 as it is directed toward the tube target area, intercepting an extremely limited quantity of the electrons of the beam and being uniformly spaced, the current in an external circuit which includes the probes or auxiliary electrodes is caused to flow in generally pulsed manner only at time periods when the scanning beam impacts the tube target to produce one color of light. It is accordingly a current flow of such nature that the voltage pulses there developed occur in such a way as to indicate the time at which color-producing phosphor strips of one chosen character are scanned. Thus there is an indication as of the rate of scanning that particular phosphor. Proper discrimination between the pulses indicative of the rate of scanning and pulses received from points of transmission can be utilized to linearize the scanning operation. Where the operation can be controlled as to linearity less often than at the time each particular color point is repeated, the auxiliary electrodes or scanning control probes may be more widely spaced from one another, although each must be similarly located relative to one particular phosphor, and a uniformity of spacing therebetween must be maintained. The difference between the two forms of control resides only in the fact that by spacing the probes or auxiliary electrodes closely together (illustratively over each blue light-producing strip), a more precise control in linearity may be established than would be the case with the wider probe separation, which might permit the scanning beam to drift from a linear state of deflection even in the extremely short time interval between successive impacts which would serve to establish correction. In the broad fundamental principles, each method is analogous.

Figure 2:
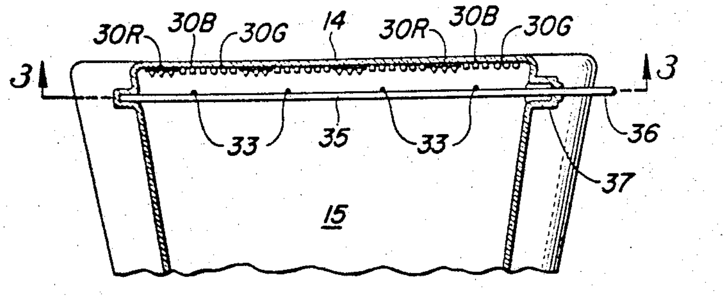
Fig. 2 is a segmental view in section of the target and portion of an image-producing tube.
Figure 3:
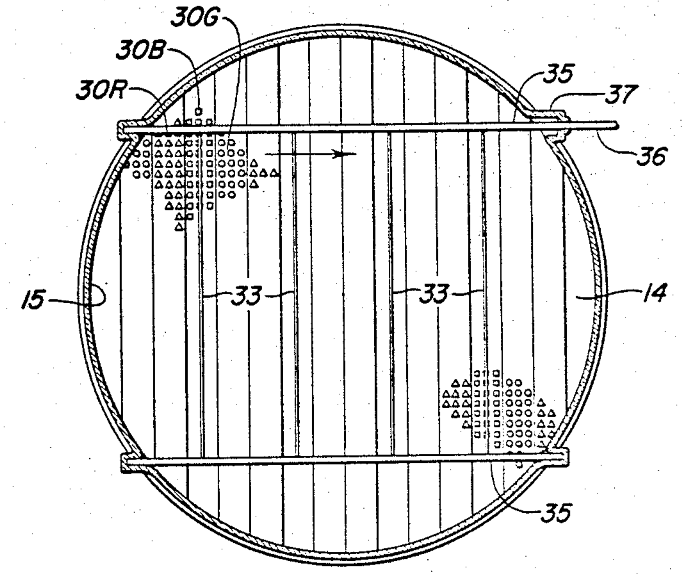
Fig. 3 is a view of the image-producing tube of Fig. 2, taken on the line 3—3 of Fig. 2, looking in the direction of the arrows.

The form of tube generally referred to in Fig. 1 is shown in more detail by Figs. 2 and 3. In each of these figures, the depicted tube end wall section is purely illustrative, and is not in any way to be regarded as being drawn to scale. However, the figures do show generally the relative relationship of the different phosphor strips, as well as the tube end wall and probe or auxiliary electrodes 33. In addition, in Fig. 3 there is a schematic representation of the support conductor 35 for the probe or auxiliary electrodes. The support electrodes, as represented in Fig. 3, are positioned at the end of each of the color strips, so that in the space intermediate each support electrode there may be phosphor coatings reacting under the influence of the electron beam to produce the red, the green and the blue light, as again represented by the designations 30R, 30G and 30B, respectively. The auxiliary electrodes 33 are positioned, as already stated, so as to intercept the impacting electron beam 21 in its passage to the coating phosphor producing one color of light, illustratively blue. By virtue of the conductivity of the supports 35 in the lateral extremeties of the raster area and the fact that the probe or auxiliary electrodes are formed as wires or conductors 33, it is sufficient that one lead-in conductor 36 be passed through the seal in the tube wall to the external circuit. As the probe or auxiliary electrodes 33 are arranged, it can be seen that they are generally in ladder formation with respect to one another. They are accurately spaced relative to each other, and each is arranged in proximity to a color-producing phosphor strip of the same characteristics. Accordingly, as the scanning beam progresses from left to right, looking at the showing of Fig. 3, for instance, so as to trace in sequence across one to another of the auxiliary or intercepting electrodes 33, a signal indication of the scanning condition is produced in the external circuit. As already mentioned herein, such signal indication is representative of the rate of beam scanning laterally relative to the phosphor coated strips.

Figure 8:
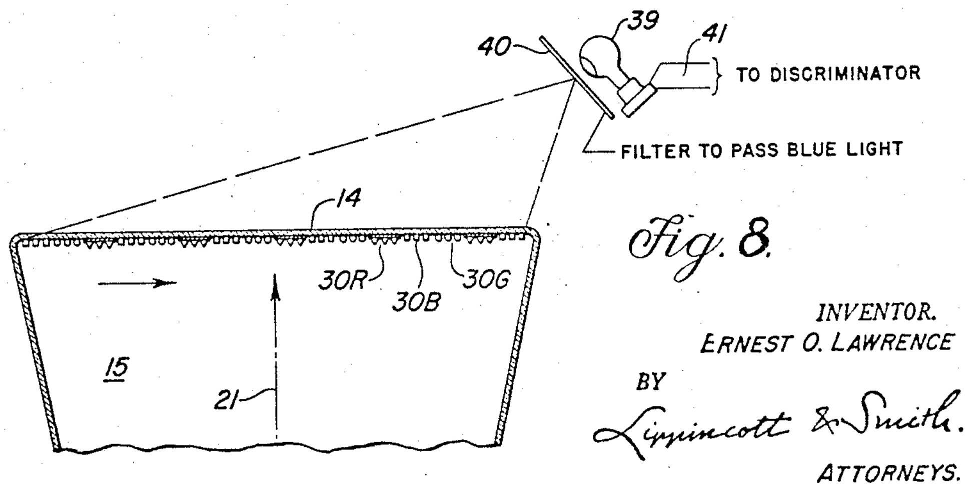
Fig. 8 is a diagram of a modification of apparatus to select signal pulses representative of the scanning in one color only.

Solely for purposes of illustration in connection with the showing of all of Figs. 2, 3 and 8, the circular designations are used to illustrate the relative positioning of the phosphor to produce green light. The red light-producing phosphor is, illustratively, designated by the triangular designations, while the small squares represent the assumed location of the phosphor to produce blue light. t can be location of the phosphor to produce blue light. It can be the probe or auxiliary electrodes 33 are alined with those phosphor strips from which blue light results after electron impact.

A modification making it possible to follow the beam scanning from one type of phosphor strip to another without the necessity of including auxiliary or probe electrodes within the tube is indicated by Fig. 8, in which the scanning cathode-ray beam 21, as it sweeps the tube target 14 to trace the raster and, illustratively, moves in a line scan so that it traces the tube target area in the position in which the tube is there shown from top to bottom, so as to impact the light-producing phosphor strips 30B, 30G and 30R, light of colors similar to those developed on the tubes of Figs. 1 and 3 are produced. The distinguishing characteristic of the tube represented by its end section in Fig. 8 with respect to the other tube already described is the absence of the auxiliary or probe electrodes in the path of the scanning cathode ray tube target area. The probe electrodes in this instance are replaced by a phototube 39, which is positioned externally of the tube. Intermediate this phototube and the target area 14 of the tube, there is positioned an optical filter strip 40. That light developed on the target area 14 of the cathode ray tube as the scanning beam 21 moves between the phosphors 30B, 30G and 30R, to produce light in the colors blue, green and red respectively, is directed not only along a viewing path substantially normal to the tube end wall 14 (or approximately normal thereto, in accordance with the usual recognized Lambert's law pattern of light radiation from the phosphor), but it also reaches the phototube 39 through the filter 40. The phototube is preferably positioned out of the path of direct radiation from the phosphor, but is nonetheless so located as to be capable of receiving the developed light image through the filter. If it be assumed that the phototube 40 is to be activated by light developed as a result of the scanning cathode ray 21 impacting a phosphor 30B to produce blue light, then the filter 40 is preferably of such character as to pass light within a relatively narrow band in the blue region of the spectrum. Illustratively, the filter 40 may pass light of wavelenths corresponding to those included in the range between 4,000 and 5,000 angstroms to the phototube (or slightly narrower limits of exciting light wavelengths). It is, however, self-evident that by a proper choice of filter, the tracking pulses may be developed from the photocell for any of the produced colors.

The output signals developed from the phototube 39 as a result of the light received thereon are then fed by way of the conductor 41, for instance, to constitute one signal which is applied to the discriminator unit such as that represented at 29 in Fig. 1.

With the filter 40 positioned relative to the phototube 39 as indicated, it will be apparent that the electrical effect upon the phototube from scanning beam activation of the phosphors coating the tube target is substantially like that which results from auxiliary or probe electrodes 33, already discussed, intercepting a certain quantity of the electron beam directed to the target area. One extremely important distinction between the two arrangements is that the probe or auxiliary electrodes contained within the cathode-ray tube 15 form the unit into a completely self-contained instrumentality, whereas the phototube 39 which operates in conventional manner to develop signal pulses across an appropriate loading resistance (not shown) is a component which is external to the cathode ray image-producing tube. It thus necessitates additional circuit components and voltage supply sources for its operation.

While this feature thus constitutes a circuit addition, it nonetheless produces the results sought and offers a plan for simplifying the tube electrode structure, which would otherwise be utilized as explained in connection with Figs. 1, 2 and 3, for producing the signal pulses indicative of the precise linear scanning rate.

Figure 4:
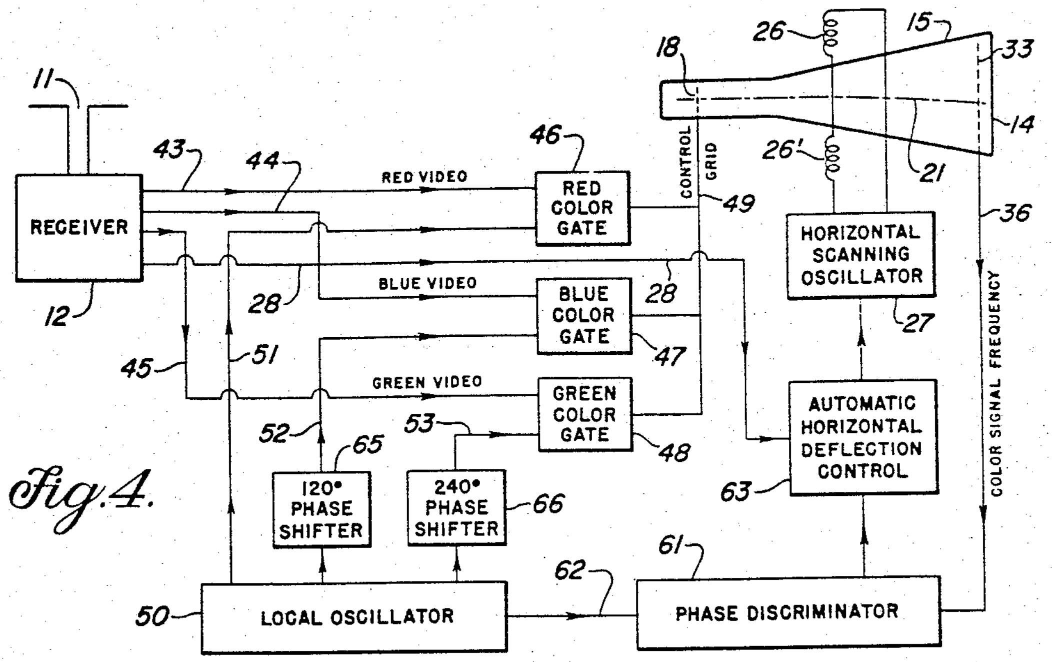
Fig. 4 is a block diagram of one form of circuit control useful in practicing the invention.
Figure 5:
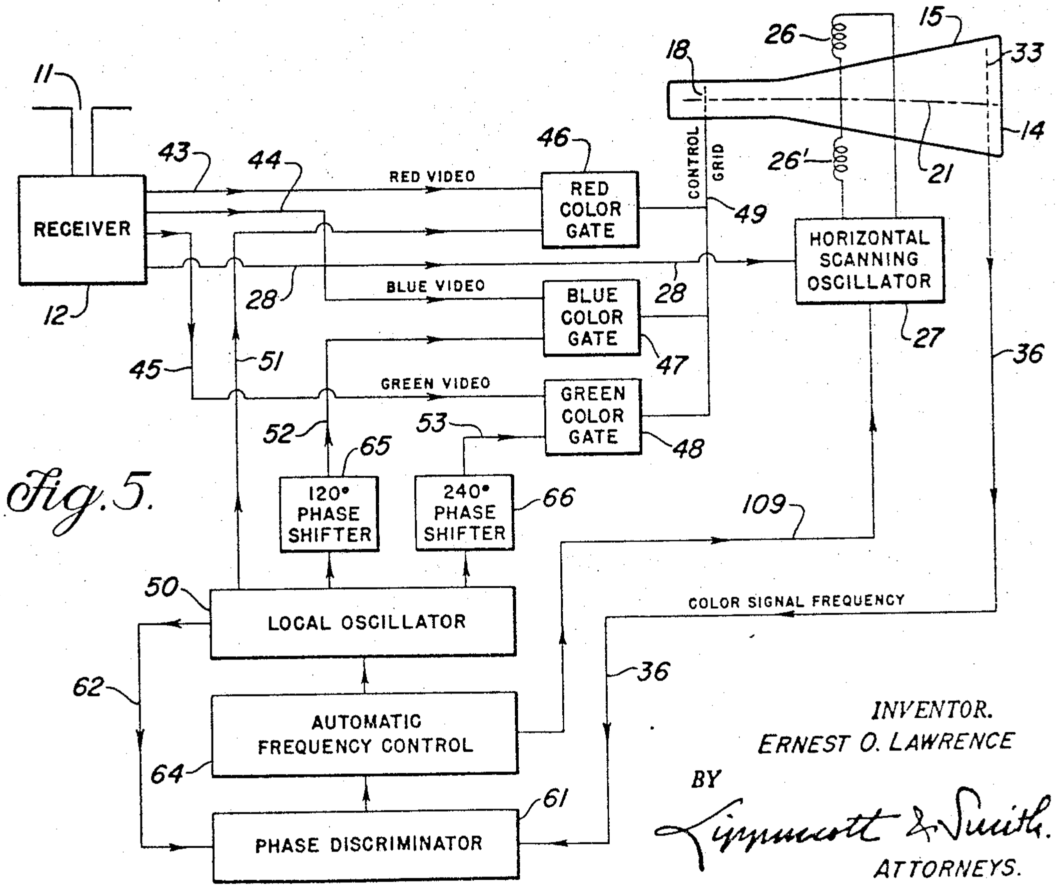
Fig. 5 is a circuit diagram in block form of a modified circuit arrangement.

Reverting now to further particular circuit embodiments by which the invention may be practiced, two suitable forms of circuit are designated by the block diagrams of Figs. 4 and 5. Considered first, Fig. 1 received signals as intercepted by the antenna 11, are received upon the receiving instrumentality 12, which is of the general character heretofore described in connection with Fig. 1. The incoming signals so suppled represent each of the three primary or component colors selected as red, blue and green, when the system is referred to an additive type of operation. Since it is probable that simultaneous polychrome operations will never be realized as a practical matter, because of the inherent bandwidth requirements thereof, the operation of the circuits to be set forth and of the tube already described will be based upon sequential forms of control. Those sequential forms readily may be of any appropriate and chosen character and selected from any of the now-known sources, such as the field-sequential, the line-sequential, segment-sequential and dot-sequential, or variations thereof.

The receiver instrumentality 12 is of such character as to be capable of appropriately distributing the signals carrying information to define red, blue or green image production. As such, for purposes of illustration, it may be assumed that the image signals representing red color components are supplied by the conductor 43, the signals representing blue image components are distributed by way of the conductor 44, while the signals indicative of the green image components reach utilization apparatus via the conductor 45. These signals, when they appear upon the various conductors 43, 44 and 45, are generally to be regarded as having been amplified in suitable video amplifiers contained within the receiving instrumentality 12. They are then supplied to the control electrode 18 of the image-producing tube 15 by way of color gates 46, 47 and 48 to control, respectively, modulation of the conventionally-represented scanning cathode-ray beam 21 in the colors red, blue and green. The color gates may be followed (where desirable) by one or more stages of amplification (not shown) particularly when desirable from the standpoint of signal polarity at the cathode-ray tube. The outputs from the gates 46, 47 and 48 are parallelly connected and control the modulation of the grid or control electrode 18 of the cathode-ray image-producing tube by way of the common output connection 49. Operation of the gates 46, 47 and 48 is preferably determined by a controlling stable local oscillator, schematically represented at 50, which has three output paths, 51, 52 and 53, connecting respectively to the gates 46, 47 and 48, operating or effective through suitable control bias circuits, which will later be described.

The operative and inoperative periods of the gates, as above noted, are suitably controlled from the local oscillator 50, acting against suitable bias to control and establish the operating period of the gates. Various forms of color gates may be utilized, but one suitable form may comprise, illustratively (as will be found from a consideration of Figs. 6 and 7, later to be discussed), multigrad tubes with the image signal being impressed preferably upon the control grids, and the keying signal supplied upon another electrode of the tube, such as the cathode or the screen grid. The choice of the electrode to maintain the control is not particular critical and well known gating practices may be followed.

It will be apparent, with the scanning beam 21 moving transversely of the color strips, that light will be developed to become observable from the target area in colors corresponding to the particular phosphor instantaneously excited. If color contamination is to be avoided in the operation, it is necessary that provisions be made whereby the scanning cathode-ray beam shall not simultaneously impinge on two phosphor strips of different light-producing characteristics for more than a minor part, at the most, of total impact period in any one particular phosphor, for otherwise color contamination will result. Illustratively, if it be desired to represent a red and the signal modulation at the selected instant happened to be that chosen color, the actual color desired could be portrayed only if the scanning beam as it impacted the target actually impinged only upon that character a phosphor strip reacting to the excitation in such a way as to produce light observable as red. If at the chosen instant the scanning beam were to impinge also upon a phosphor strip reacting to the excitation so as to produce green light, the resultant color which the observer would note would not be the desired red but an intermediate color in the range between the desired red and an undesired green which, of course, would result in color contamination and thus be undesirable. If the beam overlap of the coated phosphor strips is such as to include all varieties, the net effect is only that of adding white light or raising the background brilliance, but even this is usually not to be desired, as there are at least some periods when only two types of strip are being excited with the above noted adverse results.

To preclude the possibility of conditions such as the foregoing occurring, there are two alternative schemes of beam control available. In each of these proposals, a high quality beam focusing control which will bring the cathode-ray scanning beam to a sharp spot at the phosphor coated target is important. Any form of focusing control of a character such that the scanning spot size is brought to a diameter less than the width of any one phosphor strip, is suitable. Where the scanning beam spot diameter at impact is considerably less than the width of any one phosphor strip, it will be apparent that periods of overlap of more than one phosphor, as the scanning beam moves from one strip to another, will be extremely short. Under such circumstances, while theoretically objectionable color contamination will be present, as before noted, as a practicable matter no truly objectionable effects are realized, due to the very short period of impact at the overlap area which is but a fractional part of the time the true color is being developed. In this connection, it must be borne in mind that the developed light intensity is a function of the period of dwell of the scanning beam in any one area. If this dwell period be extremely short, it is, of course, apparent that extremely high light intensities will not develop in the overlap area.

An alternative control procedure may be adopted whereby, through the use of the focusing methods hereinabove suggested, for instance, the scanning beam is brought to a spot diameter at the point where it impinges the target electrode such that the actual impact area is less than the width of any one phosphor strip. Then, for instance, by keying or gating the scanning beam during its lateral traverse of the phosphor strip, the scanning cathode-ray beam can actually be cut off during the time period when it would overlap any two adjacent phosphor areas of different characteristics. Such gating or keying may be provided, for instance, through the application of a high-frequency keying wave upon the grid or control electrode (or an auxiliary electrode, if desired) of the cathode-ray image producing tube so as effectively to "chop" the target scanning cathode-ray beam. The gating frequency chosen with a tricolor system would preferably correspond to that frequency which is equal to three times that corresponding to the rate at which each image point is recreated. Illustratively, in a television system wherein the amplifier cut-off is assumed at about 4 megacycles, which is a practical value now rather generally standardized, it is apparent that each point of the image is traced in a period corresponding to approximately 1/8 microsecond. This represents an assumed time period during which the scanning cathode ray beam must traverse the phosphor coated strips of such character as to produce light in each of the colors red, green and blue. Accordingly, each separate adjacent phosphor strip is traversed in a 1/24 microsecond time period. Under these assumed conditions, if the scanning cathode-ray beam is to be keyed or gated during the period of scanning, it may have applied thereto as a keying or gating control a high frequency wave of a frequency of 24 megacycles. The normal tube bias is then so set that only the positive half-cycles of the keying or gating wave can initiate a flow of scanning beam current through the tube and toward the phosphor coated target. This wave control is appropriately phased so that the crests occur almost precisely simultaneously with the scanning beam impact at a central point on each phosphor strip. Any signal modulation applied to the scanning cathode ray beam supplements this keying control and produces the effects of shadow and high lights in the scanned colors.

Lest it be thought that the foregoing control would have a detrimental effect on the over-all picture, it may be recalled that the human eye, when viewing the resultant trace of the scanning beam, views all of the component or primary colors red, green and blue as white. The reduced intensity scanning beam present due to the keying or gating wave tends to create a low background intensity of white, upon which the modulation due to the incoming signal is impressed. However, the general over-all effect as far as the observer is concerned is little different than ambient light in the room in which the final picture is to be observed.

In addition, it will be appreciated that, in order to provide tracking of the scanning cathode-ray beam in accordance with this invention, the gated or keyed scanning cathode ray beam makes it possible to preserve a scanning beam during at least a part of the traverse time of each separate phosphor strip of the target, so that in the utilization of the embodiment described in connection with Figs. 2 and 3, the conductors 33 are always certain to intercept some scanning cathode-ray beam current, even in the absence of signal modulation. This intercepted beam is sufficient to permit of deriving the desired tracking information from the traverse of the conducting strands 33 of the modification of the invention described in connection with Figs. 2 and 3. In the modification of Fig. 8, it makes possible the obtainment of the selected color light at the phototube 39 each time the scanning beam traverses that character phosphor strip which produces the color light which will be revealed to the phototube through its filter 40, to initiate an output current flow therethrough and thus provide the tracking information.

Losses in light intensity which might, at first instance, be contemplated due to the limited time period of phosphor excitation because of the shorter period of beam dwell on any one phosphor, are compensated by reason of the permissible beam current increases that are possible without obtaining a picture whose contrast is too high, and, in addition, the freedom from contamination provides a color purity which improves the over-all effect.

So far, no mention has been made concerning color phasing, by which is meant the establishment of a phase coincidence between the scanning beam modulation as instantaneously effective on any of the phosphors to produce red, blue or green light and the color instantaneously scanned at the transmitter. Transmitter and receiver scanning operations may not always be initiated in phase coincidence, so that in a tricolor system, there is only one chance in three that phase coincidence may be established with the commencement of the receiver scanning operation. It is evident from the teachings in the art as it presently exists at the moment that suitable phase controls may be established automatically by virtue of the transmission of a suitable phasing signal sent out, illustratively, during the period of vertical blanking. This may generally be a signal of sinusoidal waveform radiated during blanking and of an amplitude corresponding substantially to that of the synchronizing signals superimposed upon signal amplitudes corresponding to a black level. However, because the phasing operation per se constitutes no specific part of this invention, may it suffice to point out that phasing operations to set the initial color may be carried out by purely manual means, as has already been known and explained in the art. Illustratively, push button controls of the scanning or deflection circuits which will cause the scanning beam to jump or shift are already known. The observer may establish this type of control by means of a push button or the equivalent with the extent of control determined by his knowledge of the optimum color representation of any section or area of the scene being produced. Generally speaking, there are certain areas in each reproduced scene of which the observer has general knowledge of the color to be viewed. Illustratively, the observer would expect grass to be green, rather than red or blue. If the grass were being reproduced as blue or red, the observer would depress the phasing control button once or twice, as necessary, to shift the instantaneously effective position of the scanning cathode ray beam with respect to the impacted phosphor areas to which the color of this reproduced area to that which is more natural. Once set, the phasing generally remains fixed and stable with proper synchronization of the line and field motion carried on as long as the scanning pattern traced can be measured by some precise and accurately-functioning instrumentality of the receiver. Accordingly, for illustrative purposes, it may be assumed that any desirable form of phasing is established and the description which is to follow may be interpreted in this light.

The scanning beam 21, developed within the cathode-ray image-producing color tube 15 to strike the target 14, is controlled in its deflection, as indicated by Fig. 1, by way of the horizontal or line deflection coils or yokes 26, which are connected to the horizontal scanning oscillator 27. As was also pointed out in connection with the showing of Fig. 1, this scanning oscillator is subjected to control voltages derived by way of a conductor 28 connected to receive a part of the output signals from the receiver unit 12, and to control from an automatic horizontal (line) deflection control unit 63, later to be described.

In some respects, the circuitry of Fig. 5 is identical to that referred to with respect to Fig. 4, so that, insofar as possible, components of like character in Figs. 4 and 5 are referred to by like numerals, provided the general functioning is similar. There is, however, a difference in the manner by which the control operation is achieved in Figs. 4 and 5, which will now be explained.

Making reference to Fig. 4 first in this connection, the signals or control voltages resulting from the scanning cathode ray beam 21 impinging upon the intercepting or probe electrode elements 33 are derived as a color signal frequency on the conductor 36. The resulting signals representing, as above stated, the time at which one component color of the polychrome is scanned, are supplied from the conductor 36 to a phase discriminator 61. The phase discriminator receives also input signals by way of the conductor 62 from the stabilized local oscillator 50. The local oscillator frequency is set to correspond to the optimum or desired rate of repeating the color scanning of any one selected component color in the sequence chosen, and since the sequence repeats as each point in the line is scanned, this frequency may be assumed to be 8 megacycles for a 6 megacycle T-V channel.

Accordingly, in the phase discriminator, control voltages for supplementing the effect of the horizontal scanning oscillator 27 upon the deflection coils or yokes 26 may be developed. For instance, where the pulses developed upon the conductor 36 and fed to the phase discriminator 61 lag, the pulses supplied thereto by conductor 62 from the local oscillator 50, potentials of one polarity may be developed, and, by reason of the lagging effect of the pulses representing the actual operation, an acceleration of the scanning operation may be brought about. If, on the other hand, the actual scanning operation, as indicated by the pulse signals on the conductor 36, leads the pulses developed by the local oscillator, steps must be taken to slow down the cathode-ray scanning beam deflection rate, as brought about under the control of the horizontal scanning oscillator 27. Various forms of control voltages to bring about this effect may be realized, but one suitable form may comprise an automatic horizontal deflection control unit 63, to which the control voltage is supplied, and which voltage may be amplified and applied directly to the horizontal scanning oscillator control to shorten or lengthen, as it were, the actual scanning cycle.

In the modified arrangement of Fig. 5, the local oscillator 50, which functions as in the arrangement of Fig. 4 to open the gates 46, 47 and 48 for the color signal modulation (as will later be described in detail), also supplies its output signal via the conductor 62 to a phase discriminator 61, as in the circuit of Fig. 4. In this instance, however, the phase discriminator 61, which may be of any of the general types used in the well-known forms of the so-called flywheel sync, operates to control a reactance tube which may be embodied as a part of the automatic frequency control element 64. This component now may be used as a reactance across the tank circuit of the local oscillator and serves to regulate its rate of operations to make it coincide with the actual beam scanning rate. Thus the opening and closure of the color gates 46, 47 and 48 now will be controlled by the rate at which the scanning is actually being developed. The output from the reactance tube also may then be applied in a similar manner to a horizontal scanning oscillator circuit 27.

In the modification of Fig. 4, the output of the local oscillator 50, as available on the conductor 62, is compared in phase with the voltages available on the conductor 36, with the comparison made in the phase discriminator 61. From this point on, the scanning operation is modified under the control of the automatic horizontal deflection control 63, modifying the operation of the horizontal scanning oscillator 27 when the deflection control 63 is modified in its operation by the synchronizing pulses received on the conductor 28.

In the modification of the invention as set forth by Fig. 5, signals are also available on the same conductor 36 to represent the actual rate of scanning of the cathode ray beam across the tube target. These voltages are compared with the local oscillator output in the phase discriminator 61, but in connection with the Fig. 5 modification, the automatic frequency control unit (of a character generally similar to the element 63 of Fig. 4) serves now to control back upon the local oscillator and also to control the horizontal scanning oscillator 27.

The signal voltages available upon the conductor 28 are, of course, the horizontal synchronizing pulses transmitted and received during each beam blanking or return line period. Accordingly, when these pulses are applied to the automatic horizontal deflection control along with the output of the phase discriminator or the automatic frequency control voltages, they control the actual scanning operation in accordance with the actual phase displacement.

It was above suggested that each of the color gates 46, 47 and 48 is controlled from the local oscillator 50. If, as above noted, the local oscillator 50 is designed to operate at a frequency of 8 megacycles, it will be appreciated that this element may be used to control the opening and closing of the color gates. Since the gates 46, 47 and 48 must operate in sequence, regardless of the form of system upon which the operation is based, if the desired tracking is to be maintained, it will be appreciated that these gates may comprise multielectrode tubes, to one electrode of which the modulation signals from the receiver 12 are supplied, and to another electrode of which the gating signal constituting the output of the local oscillator 50 is supplied. The tube bias is so set that, regardless of the presence or absence of signals on any one of the conductors connecting the gates to the receiver element 12, that gate only will be open during a selected portion of the oscillator cycle. Since it is important to avoid color contamination as the scanning beam traverses the various phosphor strips, it is generally desirable to restrict the opening of any one of the gates 46, 47 or 48 to an operating period less than the positive half-cycle of the keying or controlling wave representing the output of the local oscillator 50. Accordingly, if the local oscillator 50 develops a sine wave output at the suggested frequency of 8 megacycles, the bias on the tube constituting the gating tube in any one of the color gates 46, 47 or 48 may be so set that the keying wave must have an amplitude in the positive direction (assuming the keying to take place on a grid or similar electrode) which corresponds to the crest amplitude and 30° (electrical), for instance, either side of the crest.

Under the circumstances, for the assumed 8-megacycle local oscillator 50, the gate will be open for 1/6 of each cycle of the oscillator, or for a period of the order of 1/48 of a microsecond, after which it will close for 5/48 of a microsecond and reopen to follow the same cycle. All gates operate in the same manner, except that by reason of the fact that the scanning beam 21 traverses successive phosphor strips reacting under the electron beam impact to produce different colors of light, and since it is apparent that the convenient way to open and close the gates is by virtue of a reliance upon some established amplitude value of the controlling wave, it is desirable to introduce into the control lead from the local oscillator 50 to the gates 47 and 48, for instance, suitable phase shifters of any known and desired character. The phase shifter 65, included in the lead 52 to the color gate 47, is so designed as to produce a phase change of 120° (electrical) in the wave in the conductor 52 relative to that in the conductor 51.

Similarly, the phase shifter 66, included in the lead 53 between the local oscillator 50 and the color gate 48, is arranged to produce a phase shift of 240° (electrical) between the wave in the conductor 51 and the conductor 53, and 120° (electrical) between the wave in the conductor 53 relative to that in the conductor 52. This control establishes a sequential opening and closing of the gates 46, 47 and 48, and where the bias is set similarly for each gate, it will be apparent that for the assumed operational sequence and control level during each 1/8 microsecond period, the gate 46 will be open for an assumed 1/48 microsecond, with all other gates closed; then all gates will be closed for the succeeding 1/48 microsecond period, after which the color gate 47 will open for a 1/48 microsecond period, with color gates 46 and 48 closed, to be followed by a 1/48 microsecond period of all gates closed, which will be succeeded by a 1/48 microsecond opening of color gate 48 and a similar-duration period of all gates 46, 47 and 48, after which the operational cycle will then be repeated. This form of operation is similar in the circuitry of each of Figs. 4 and 5.

The conductors 43, 44 and 45 all receive the signal output from the receiver 12, so that signal modulation is fed to the modulating electrode 18 of the cathode-ray tube 15 by the conductor 49 from that gate which is instantaneously in an open or signal-passing state. If it be assumed that the signal modulation applied from the receiver 12 to the gates 46, 47 and 48 in a polarity such as to cause, for highlights in the picture, an increase in the current flow through the gate, it is evident that for a similar polarity condition on the cathode-ray tube 1, additional stage of amplification following the keying and opening of the gates is desirable, unless the signal output level is such that a cathode output from the gating tube can be utilized. The question of signal polarity is purely one of engineering design, and is therefore merely mentioned in passing to show generally the flexibility of the system and its operation.

Figure 6:
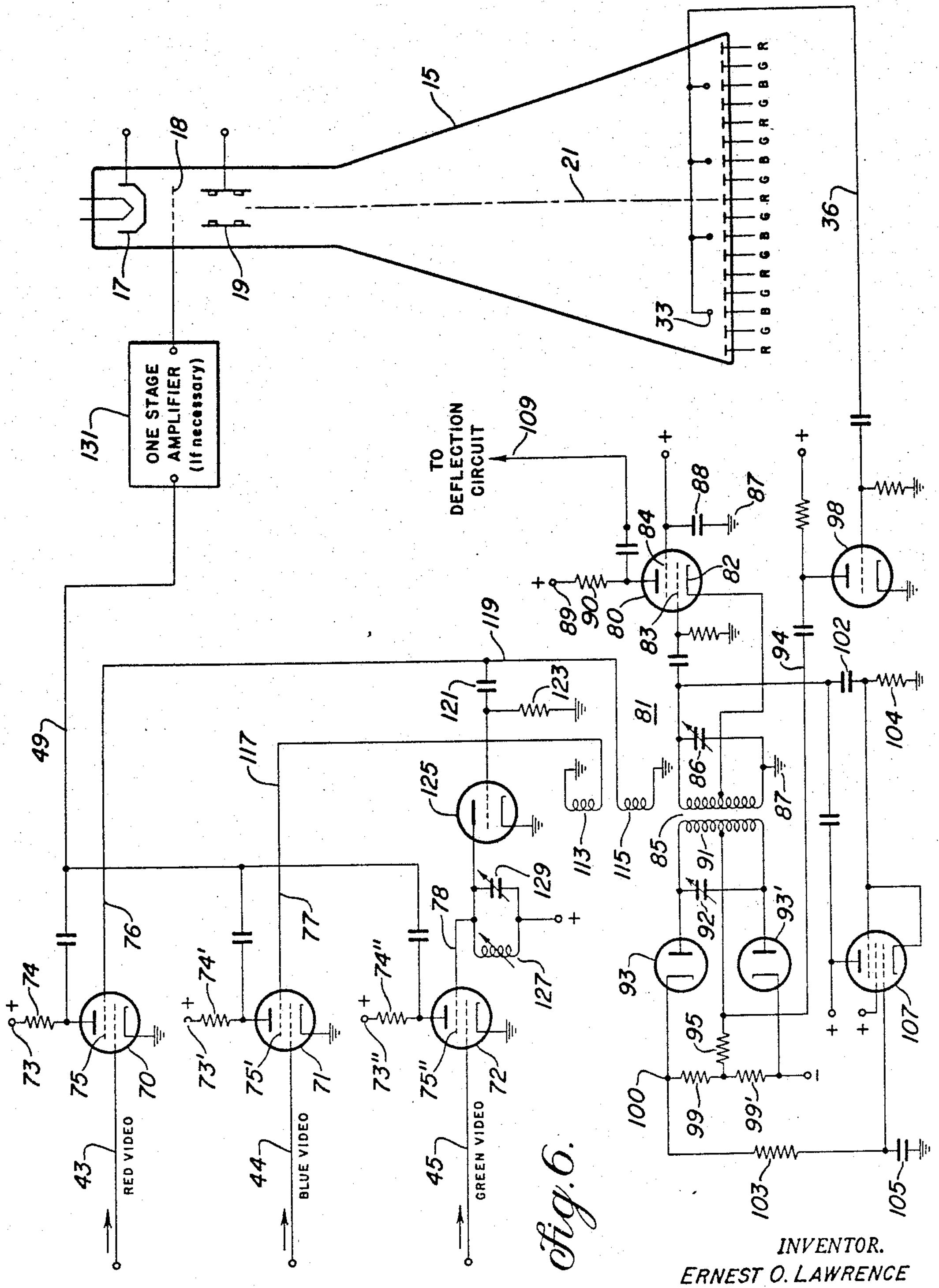
Fig. 6 is a circuit arrangement illustrating one form of control for practicing the invention in the form diagrammed in Fig. 5.
Figure 7:
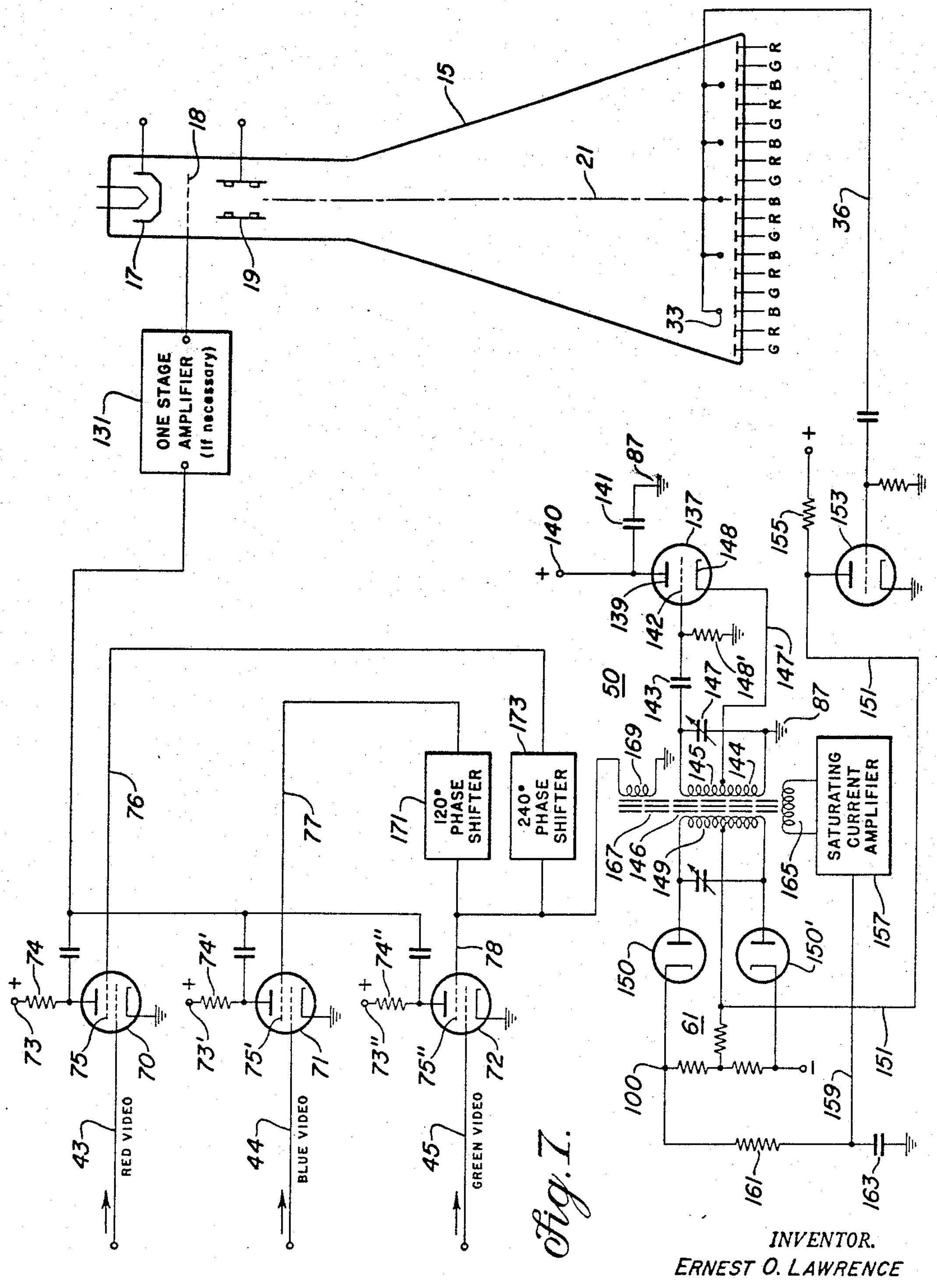
Fig. 7 is a modification of the circuit of Fig. 6.

Circuitry to establish the type of control set forth is shown by Figs. 6 and 7, of which reference will first be made to Fig. 6, where the color gate 46 of Fig. 4 or 5 is represented by the gate tube 70, the color gate 47 is designated as the gate tube 71, and the color gate 48 is designated as the gate tube 72. The input video signals to the tube 70 are applied by way of the input conductor 43 and, illustratively, these signals are applied upon one of the cold electrodes, such as the control grid. Since the tube 70 is gated to open at time periods when it is intended the "red" signals are present, it may be considered, for illustration, as if only red signals were present in the conductor 43. The video signals, as supplied by conductors 44 and 45, are similarly fed to the gate tubes 71 and 72. They are effective as if they were "green" and "blue" signals on these gates. The gate tubes 71 and 72 are all supplied with suitable operating voltages from sources (not shown) which may be assumed to have the positive terminal connected at the points 73, 73' and 73'', and connected then to the plate or anode elements of each of the gate tubes 70, 71 and 72 through loading resistors 74, 74' and 74''. To provide the gating effect upon these tubes, the control voltages or outputs from the local oscillator 50 may be assumed to be supplied on, for instance, a screen electrode 75, 75' and 75'' of the respective tubes by way of conductors 76, 77 and 78 respectively. From the explanation above made in generalization, it will be evident that the control voltages on the conductors 76, 77 and 78 are each 120° out of phase with each other. Bias upon the gating tubes 70, 71 and 72 will be assumed to be such that the tubes are maintained in a non-conducting state, regardless of the input signals applied over conductors 43, 44 or 45, except when the control voltage on the conductors 76, 77 and 78 reaches an amplitude value which is set as the operating bias on the tube. This may be chosen as one suitable portion of the operating cycle, but, illustratively, it is so set that the amplitude of the signal or control wave from the local oscillator effective on tube 70, for instance, as a positive voltage will be effective as a cut-off voltage on the other tubes. Likewise, similar effects take place on the other tubes, so that when tube 71 conducts, tubes 70 and 72 shall be non-conducting, and so on. From the explanation already made herein, it will be appreciated that one satisfactory bias value may be that at which the tube conducts for the period of the cycle which includes 30° (electrical) each side of the crest value. The bias means is not shown but may be any desired form, such as that obtainable from any suitable potentiometric or other bias source.

The exemplification of the control shown by Fig. 6 is one which is particularly applicable to the showing of Fig. 5. The local oscillator designated as 50 in Fig. 5 is represented by the so-called Hartley-type oscillator comprising the tube 80, which is herein assumed to be a four-electrode tube. The oscillating circuit 81 is set up between the tube cathode 82, the control electrode 83 and the screen electrode 84 in such a way that the tube grid connects to one end of the oscillatory circuit 81, comprising the primary winding of transformer 85 shunted by a suitable tuning condenser 86. The other end of the oscillatory circuit is connected to ground at 87. The tube cathode 82, as is well known, taps to an intermediate point on the inductance element of the tank circuit 81, while the screen electrode 84 connects to ground through a condenser 88.

Positive plate voltage for the tube 80 is applied from a terminal 89, as indicated, with the tube output to control the tube deflection means (not shown in Fig. 6) being taken across the resistor 90. The oscillatory frequency of this tube is set to correspond to that above discussed for the local oscillator 50, and, as such, is approximately 8 megacycles for operating conditions where the color repetition is in a sequence of three colors, such as red, blue, green, red and so on, as already explained. The specific embodiment of Fig. 6 will be just slightly different, but explained more fully as to frequency value at a later point herein.

The oscillating tank circuit 81 feeds oscillations by way of the primary winding of transformer 85 to its secondary winding 91, across which the condenser 92 is connected. Voltages occurring at the oscillation frequency are supplied to the diodes (or other rectifiers) 93 and 93' in push-pull. The diodes also have supplied thereto in push-push fashion by way of the conductor 94, connecting across the resistor 95 another voltage in the form of a signal which represents the rate at which the scanning beam 21 of the cathode-ray tube traces or tracks the conducting strands 33, or traces the phosphor strips of one selected character. The voltages as developed in the conductor 36 during the scanning operation, as already explained, are then fed through a suitable amplifier 98. The resultant output signals are then discriminated in phase against the oscillator output so that, with phase changes between the pulses on the conductor 36 and the voltages occurring at the oscillator frequency as applied to the diodes 93 and 93', there will be a change in potential available across resistors 99 and 99', which potential (voltage) is available at the point 100. This voltage is then supplied through the integrating circuit comprising the series resistor 103 and condenser 105, which connects at one side to ground so as to be made available upon the control electrode of the reactance tube 107. The reactance tube 107 is connected across the tank circuit of the oscillator tube 80. Voltages are also supplied to the reactance tube 107 from the oscillating circuit. These later voltages are supplied in phase quadrature through the phase-shifting network comprising the condenser 102 and the resistor 104 connected to the tube cathode in well-known manner. In accordance with the variation in gain of the reactance tube (controlled by the potential change resulting from the current flow through the discriminator tubes) supplied across condenser 105, the reactance tube serves to control the oscillating frequency so that a frequency increase or decrease is brought about in accordance with the variation in current flowing through the reactance tube 107 in well known manner, the reactance connected across the tank circuit 81 being a variable which is a function of the tube current whereby an increase or decrease in the oscillator frequency results. Thus, the output voltage available at the terminal point 109 to control the deflection circuit is changed.

The general circuit arrangement of the reactance tube, the oscillator and the discriminator just referred to is similar in many respects to one form of horizontal synchronizing circuit heretofore practiced, to some extent, in connection with some black-and-white television receivers. The arrangement herein set forth, however, operates under the control of pulses on the conductors 94, which are indicative of the pulses developed as a result of the actual scanning operation within the tube, rather than under the influence of line synchronizing pulses as in line synchronizing. Accordingly, the control pulses appear in time coincidence to the actual passage of the scanning beam 21 across the conductor elements 33 within the cathode-ray tube, or, in one alternative operation, as explained, they are measured by the time of excitation of the photo tube 39 as a result of revealing light thereto through its selected filter.

It was above explained in connection with the diagrammatic showing of Figs. 4 and 5 that the color gates 46, 47 and 48, represented in Figs. 6 and 7 as the control tubes 70, 71 and 72, are supplied 120° (electrical) out of phase with respect to each other. In the arrangement shown in Fig. 6, however, one further modification has been proposed. In this arrangement, as contrasted with the schematic showings of all of Figs. 1 through 5, the coated phosphor strips within the tube 15, instead of being in a sequential order of three cyclically repeating colors, such as red, blue, green, and so on, as in the preceding showings, are arranged in a sequence such that one color repeats more often. Such a color sequence may be blue, green, red, green, blue, green, and so on. In this way, it will be observed that the blue areas appear every fourth strip, as do the red areas, while the green areas reappear every second strip.

With this form of the invention, it will be appreciated that it becomes possible to increase the width of the individual phosphor strips slightly, in that two strips, namely green and red, or green and blue, now correspond to the width of one picture point. Consequently, the control frequencies may be lower, the width of the strips increased, and the resultant focusing of the scanning cathode ray beam slightly less sharp. It is a well established fact that a considerable portion of the picture detail rests in the green, to which color the human eye is most sensitive. Therefore, by providing for each point of the picture to be reproduced in green, and alternate points of the picture to be reproduced in red or in blue, it will be appreciated that the color cycle may change slightly. The result of such minor modification is that the actual definition in green is double that in red or in blue, but the color values supplied by the red and the blue are adequate to provide the complete color representation necessary for satisfactory operation.

The proposal of Fig. 6 is purely illustrative, but on the assumption herein made, it will be appreciated that while the system and the circuitry up until this point have been described as illustrative of the operation with the type of tube depicted by any of Figs. 1, 2, 3 and 8, the operation for the particular form of phosphor strips depicted in Fig. 6 will be only slightly different. For the 4-megacycle video band picture, each picture point is still analyzed in a ⅛ microsecond period, but since the blue and the red points occur only at alternate points, they are repeated each ¼ microsecond. Since the oscillator 80 is to control the opening and closing of the gating tubes 70 and 71, and because correct color representation requires that incoming video signals which control the modulation of the scanning beam 21 to depict the high lights and low lights in red or blue areas shall be effective only when the scanning cathode ray beam impinges on a phosphor strip to produce the desired color light, it will be appreciated that the frequency of the local oscillator 80, instead of being at the assumed 8 megacycle frequency for the pure tricolor system, may now be reduced to a frequency of 4 megacycles. Under these circumstances, with the representations of red and blue alternating after each green representation, the windings 113 and 115, forming auxiliary windings of the transformer 85, are each reversed with respect to each other. Phase displacement signals thus appear on each of conductors 117 and 119, which connected to the windings 113 and 115. Such signals are 180° phase displaced relative to each other and occur at a 4 megacycle frequency.

Bias on the tubes 70 and 71 is set generally, as above noted, to such value that the tubes conduct only during a limited part of the positive half-cycle of each wave. This control then makes it possible to operate the gating tubes 70 and 71, respectively, so that they open and close at a 4 megacycle rate. However, the time period of "open" (current passing) state may represent only a fractional part of the positive half-cycle of the control voltage in each of conductors 117 and 119. An illustrative time proportion may be considered as ⅙ the positive half-cycle period, which would mean opening 30° before the wave crest is reached and a closure 30° after passing the wave crest.

With respect to the green signal distribution, however, the aforesaid operational condition is based upon repeating information in green at the assumed 8 megacycle rate, whereby the gating tube 72 must open as many times as each of the red or the blue gating tubes 70 and 71, combined. Accordingly, to achieve this result, the control voltage appearing on the conductor 119, for instance, is fed through the shifting network comprising the series condenser 121 and the shunt resistance 123, to shift its phase by 90°, and thence into a tube 125 in whose output circuit there is a tuned circuit comprising the parallelly connected inductance 127 and condenser 129. These inductance and capacity elements are tuned to a frequency of twice the fundamental developed in the oscillatory circuit 81. The double frequency (8 megacycles according to the assumed example) is supplied through conductor 78, to provide a gating signal upon the screen electrode 75'' of the gating tube 72 for the "green" signal on conductor 45.

Accordingly, the tube 72 opens and closes with a 90° phase displacement with respect to the opening and closing of either of the gating tubes 70 and 71. This makes it possible for the signals appearing on the conductor 45, which may be considered, illustratively, as representative of green in the picture, to control modulation of the scanning beam 21 to depict green high lights and low lights by reason of excitations of phosphor strips 30G in the tube 15.

It will be observed that the output from each of the gating tubes 70, 71 and 72 is derived across output resistors 74, 74' and 74'', respectively, and appears as parallel output signals feeding into a conductor 49, as shown by Figs. 1 and 2 particularly.

From what has been above stated, it is evident that if, for reasons of signal polarity, it becomes desirable to have a cathode output for these gating tubes, well known connections for this purpose may be provided, or, in the alternative, if, for reasons of satisfactory operation, signal polarity, keying purposes, or the like, the signal polarity available on the conductor 49 is reversed from that desired, any odd number of further stages of amplification may be added in the form of amplifier unit 131 of conventional form. The amplifier 131 (or conductor 49) supplies its output signal to the control eletrode 18 of the cathode ray tube 15 to provide the scanning beam modulation. Other components are not shown in this figure, but follow generally the arrangement of the schematic showing of Fig. 1.

Reverting now, for instance, to the modification of Fig. 7, it will be observed that this generally follows the form of arrangement more particularly shown by Fig. 4, where signals from the receiver 12 are distributed by way of the conductors 43, 44 and 45 to the tubes 70, 71 and 72, constituting the various color gates represented as the color gates for red, blue and green, shown at 46, 47 and 48, respectively, in Fig. 4.

In the modified arrangement of Fig. 7, using a tube of the type described by Fig. 3, the local oscillator 50 comprises the tube 137, which may be of the shown triode type, if desired, receiving its voltage for the plate 139 from a terminal point 140. The condenser 141 forms a by-pass to ground at 87. The tube grid 142 connects through the condenser 143 to one end of the primary winding 145 of a transformer 146, which winding is shunted by the condenser 147. The other end of the primary winding connects again to ground at 87. The oscillatory circuit 144 then includes the primary winding 145 and condenser 147 for the oscillator tube 50, which is also generally in the form of a Hartley oscillator. As such, the tube cathode 148 connects by way of a conductor 147' to some intermediate point on the oscillatory circuit. Bias for the tube is applied by way of resistor 148'.

The oscillator 50 is preferably highly stable. Its frequency is established in the instance here to be depicted by the factors already mentioned above, and, as such, may be assumed, for illustrative purposes, to be approximately 8 megacycles. The local oscillator feeds its energy through the transformer 146 to the transformer secondary 149, which is connected in push-push with the diode tubes 150 and 150' forming a part of the discriminator network. As in the showing of Fig. 6, a voltage representing the actual beam scanning rate in the tube 15 is applied to the diodes 150 and 150' in push-push by way of the conductor 151. Voltage from the conductor 151 is obtained as a result of the signal pulses appearing on the conductor 36, as a result of the already described movement of the scanning beam 21 across the various conductors 33 within the tube. These signal pulses are transferred, after amplification, through the amplifier 153 and fed across the load resistor 155 into the conductor 151.

Within the phase discriminator 61, formed by the diodes 150 and 150', together with their already-mentioned circuit components, the phase of the local oscillator output is discriminated against the tracking pulses, so that the voltage appearing at the point 100 (similar to Fig. 6) is effective to serve as a reactance control signal upon a saturating current amplifier of generally known form, and thus schematically illustrated at 157. The saturating current amplifier 157 receives its control voltage through a conductor 159, which is connected across the pulse filtering circuit, including the resistor 161 and the integrating condenser 163. The saturating current amplifier 157 is provided with the usual saturating winding 165 and the saturatable reactor 167, which is controlled in well-known manner. Connected by a tertiary winding 169 to the transformer 146, there is a connection by way of conductor 78 to one of the color electrodes, such as the screen 75″ of the gating tube 72. The voltage available at the screen electrode 75″ is also supplied through two phase shifting networks, 171 and 173, of which the former provides a 120° (electrical) phase shift, for instance, and supplies its output through the conductor 77 to the screen electrode 75′ of the gating tube 71. The phase shifter 173 provides a phase shift of 240° (electrical) of the voltage available at the tertiary winding 169, and supplies this phase shifted voltage through the conductor 76 to the screen electrode 75 of the gating tube 70.

Accordingly, it will be apparent that each of the tubes 70, 71 and 72 is so controlled that the crest of the wave representing the frequency of the oscillator 50 reaches each screen grid with a phase shift of 120° (electrical) with respect to the tube preceding and following. If now the biasing voltage upon each of the tubes 70, 71 and 72 is set as above described, so that the control wave supplied to the screen grids will cause the tubes to draw current only for that part of the cycle representing, for instance, 30 electrical degrees either side of the crest positive value, it will be apparent that the aforesaid conditions of operation will be achieved. Thus, where the oscillator frequency 50 is assumed at 8 megacycle value, each of the tubes 70, 71 and 72 will conduct, or arrive at a signal passage state, for a 1/48 microsecond period, with the conductive period of one relative to the other being in accordance with the phase displacement of the voltages on conductors 76, 77 and 78 relative to each other, as established by the conventionally-represented phase shifters 171 and 173. It is believed that the general type of phase shifting network is so well known that further illustration thereof is unnecessary. The remaining portion of the circuitry of Fig. 7 is not shown, inasmuch as the schematic showing of Fig. 4 is clearly illustrative of the complete operation.

It will be apparent that various modifications in the general nature of the showing may be made, so that the forms which the invention assumes according to the herein-described arrangement must be regarded purely as illustrative, and not limiting.

Having now described the invention, what is claimed is:

1. In a polychrome television image producer wherein a cathode-ray beam is arranged to be deflected along a series of substantially parallel and adjacent paths collectively forming repeating scanned fields and is adapted to impact a phosphor target formed from a multiplicity of adjacent strips each of a width less than that of an image point to be reproduced, with adjacent strips formed of different compositions such that the group when impinged by the deflected cathode-ray beam is adapted successively to develop light in several component colors additively producing white, the scanning linearizing circuits comprising means to develop a signal pulse series indicative of the rate of repetition of a single selected color component in the representation of an image area concurrently with the production of the said color image detail in the same selected color, means to generate a local signal indicative of an optimum rate of color repetition in the single color, means for comparing the two signals as to phase to develop a control signal representative of the departure from optimum, and means to accelerate and decelerate the scanning along each path under the control of the developed signals.

2. In a polychrome television image producer wherein a cathode-ray beam is arranged to be deflected along a series of substantially parallel and adjacent paths collectively forming repeating scanned fields and is adapted to impact a phosphor target formed from a multiplicity of adjacent strips each of a width less than that of an image point to be reproduced, with adjacent strips formed of different compositions such that the group when impinged by the deflected cathode-ray beam is adapted successively to develop light in the several component colors additively producing white, the scanning linearizing circuits comprising means to develop a signal pulse series indicative of the rate of repeating the representation of an image area in a single selected component color concurrently with producing light in the single selected component color, means to generate a local signal indicative of an optimum rate of color repetition in the single color, a discriminator for comparing the two signals as to phase to develop a control signal representative of the departure from optimum, and means to accelerate and decelerate the scanning along each path under the control of the developed signals.

3. The polychrome television image producer claimed in claim 1, comprising, in addition, means to signal-modulate the scanning cathode ray beam so that the light developed in each component color is signal-modulated.

4. The color television apparatus claimed in claim 1 wherein the signals indicative of the rate of color scanning are photoelectronically generated.

5. The color television apparatus claimed in claim 1 comprising, in addition, means to produce the signals indicative of the actual scanning rate independently of the presence and absence of signal modulation in the selected color.

6. The color television apparatus claimed in claim 1 wherein the phosphor target comprises a series of elongated strips each having one dimension less than that of the smaller dimension of a picture point to be analyzed and the second dimension of the order of one dimension of the raster to be traced and comprising also means to trace the scanning beam relative to the target so that it traces paths transverse to the long dimension of the strips.

7. The color television apparatus claimed in claim 6 comprising, in addition, scanning beam intercepting means located in proximity to the color strips producing one selected component color of light, and means for intercepting electrons from the scanning cathode ray beam for generating the control pulses each time the said color light is generated under beam impact.

8. The apparatus claimed in claim 7 wherein the beam intercepting means comprises a plurality of conducting strands and said means is arranged parallel to one edge of the phosphor target strips.

9. A polychrome television image producer wherein a scanning cathode-ray beam is arranged to be deflected along a series of substantially parallel and adjacent paths collectively forming repeating scanned fields and is adapted to impact a phosphor target formed from a multiplicity of adjacent strips each of a width less than that of an image point to be reproduced, with adjacent strips formed of different compositions such that the group when impinged by the deflected cathode-ray beam is adapted successively to develop light in the several component colors additively producing white, the scanning linearizing circuits comprising means to develop a signal pulse series indicative of the rate of repetition of a single color component in the representation of an image area concurrently with the production of light in the single selected color component, means to generate a local signal indicative of an optimum rate of color representation in the single color, means for comparing the two signals to develop a control signal representative of the departure from optimum of the local signal, means to accelerate and decelerate the scanning along each path under the control of the developed signals, a plurality of gate tubes of a number corresponding to the number of component colors in the additive system, means for supplying signal modulation to each of the gate tubes, means for modulating the scanning cathode ray beam under the control of the output signals from the gate tubes, and means for keying the gate tubes to a signal-passing state in cyclic manner by the developed control signals so that the signal modulation of the scanning beam coincides with the light color developed by the scanning beam in its instantaneous target-impacting position.

10. The apparatus claimed in claim 9 comprising, in addition, means to maintain a continuously present scanning cathode ray beam without regard to the presence and absence of signal modulation, the said beam being of such low intensity as to be substantially incapable of exciting the impacted phosphor to an observable extent so that any light developed at the impacted target area due to the said low intensity beam light from all phosphors is additively effective only as white light to initiate generally unobservable white background light representations.

11. The polychrome television image producer claimed in claim 1 comprising, in addition, means responsive to the developed control signals for keying the image signal modulation in accordance with the color representation instantaneously developed by the scanning cathode ray beam.

12. The color television device claimed in claim 11 comprising, in addition, means to phase the color of the instantaneously-effective modulating signal to correspond to the color signal reproduced.

13. The color television system claimed in claim 12 comprising, in addition, a phase control means for distributing signal modulation to control the scanning beam intensity by signals indicative of the instantaneously scanned color.

14. A polychrome television image-producing device having an image-producing tube formed of a plurality of adjacently-positioned elongated strips each coated with a phosphor adapted to produce light under cathode ray beam impact in a different color from that of the adjacent strip and all collectively producing light in each of several selected component colors additively combining to produce white, said strips of like character repeating from strip to strip in a cyclic fashion and transverse to which strips a scanning cathode-ray beam is adapted to be traced in a line-for-line manner, the combination comprising means to apply signal modulation to the scanning cathode ray beam so as to modulate the beam to produce light in selected colors in varying intensities as the beam impacts the target strips in its path of deflection; means to develop signal pulses indicative of the rate of repetition of a single selected component color as the scanning cathode-ray beam impacts the phosphor-coated strip areas of the selected color to produce light; means locally to develop signal pulses repeating at a frequency related to the optimum for developing the said pulses indicative of one selected color only of light; a phase-responsive circuit for comparing the two developed signals, means for accelerating or decelerating the beam scanning in directions transverse to the strip length with departures in the actual speed thereof with respect to the optimum represented by the local generator and means to gate the signal modulation of the scanning electron beam to the individual signals of the color cycle in accordance with the instantaneous rate of scanning of the several colors.

15. The polychrome television image-producer claimed in claim 14, comprising, in addition, means to signal-modulate the scanning cathode ray beam so that the light developed in each component color is signal-modulated.

16. The polychrome television image-producer claimed in claim 15 comprising, in addition, means responsive to the developed controlled signals for keying the image modulation in accordance with the color representation instantaneously developed by the scanning cathode ray beam.

17. In polychrome color television apparatus for recreating color images upon a cathode-ray tube target area formed in a series of elongated phosphor-coated strips each of sub-elemental width and arranged in a cyclic repeating sequence to produce light in the several colors of the polychrome under impact excitation by a cathode ray scanning beam arranged to be deflected relative to the strips in paths generally transverse to the long dimension, a scanning beam control circuit comprising light-responsive means to develop signal pulses indicative of the rate of beam traverse of one character light-producing phosphor, a local oscillator to develop a control signal at a frequency representative of the optimum frequency of repeating each selected color cycle, means for generating a signal indicative of the instantaneous phase displacement of one of said signals with respect to the other, and means for accelerating the scanning rate transverse to the strip length under the control of said generated signal where the said signal is of one sign and for decelerating the scanning rate transverse to the strip length under the control of said signal where the said signal is of opposite sign.

18. A cathode ray tube for producing polychrome television images comprising an evacuated envelope having at one end thereof a target surface, said target surface having coated thereupon a plurality of elongated strips of phosphor materials such that adjacent phosphor strips are of different composition and each produces light in a different color, the phosphors being arranged in a cyclically-repeating sequence of strips reacting under the impact of a scanning cathode-ray beam to produce light in a plurality of component colors collectively adding to produce white; a plurality of conducting strands of a diameter small relative to the coated strip width supported substantially adjacent and parallel to the phosphor strips to produce one color of light and extending longitudinally thereof so that a minute portion of the scanning beam electron stream to produce light at the target is intercepted by the beam as it is directed toward the target, each such conducting strand being positioned adjacent a like color light-producing phosphor, and terminal connections secured to the light-sensitive strip elements.

19. In a polychrome television receiver, an image-producing tube comprising an envelope having a viewing target formed of a plurality of adjacently-positioned elongated strips, a phosphor coating on each of the strips, said coating from strip to strip being of a composition different from each adjacent strip so that a cathode ray scanning beam traversing the strips generates light in different component colors of an additive color system and in a selected color cycle in moving from strip to strip; means to generate within the tube a scanning beam for scanning the said phosphor strips; means for deflecting the scanning beam to trace rasters formed of a plurality of lines each representing a traverse of the scanning beam over the adjacently-positioned strips; means for developing concurrently with the production of light in one selected color a signal indicative of the rate at which said one selected color of the color cycle is repeated; means for locally developing signals representative of a selected optimum color repetition rate of the said color; discriminating means for phaseally comparing the two developed signals, means for accelerating or decelerating the beam deflection in its linear path across the strips in accordance with the color signal pulses being of lower and higher frequency than the locally-developed signal; means for supplying incoming signal modulation to modulate the scanning cathode-ray beam to produce light in the selected component colors during scansion; and means to gate the modulation signals supplied to modulate the scanning beam to bring the modulation into coincidence with the instantaneous position of beam impact on the elongated strip target.

(References on following page)

References Cited in the file of this patent

UNITED STATES PATENTS

| | | |
|---|---|---|
| 2,399,421 | Artzt | Apr. 30, 1946 |
| 2,461,515 | Bronwell | Feb. 15, 1949 |
| 2,529,485 | Chew | Nov. 14, 1950 |
| 2,530,431 | Huffman | Nov. 21, 1950 |
| 2,532,511 | Okolicsanyi | Dec. 5, 1950 |
| 2,545,325 | Weimer | Mar. 13, 1951 |
| 2,587,074 | Sziklai | Feb. 26, 1952 |
| 2,597,743 | Millspaugh | May 20, 1952 |
| 2,548,722 | Bradley | Aug. 11, 1953 |
| 2,655,556 | Abelson | Oct. 13, 1953 |
| 2,671,129 | Moore | Mar. 2, 1954 |
| 2,689,269 | Bradley | Sept. 14, 1954 |